(12) United States Patent
Zhao et al.

(10) Patent No.: US 7,607,508 B2
(45) Date of Patent: Oct. 27, 2009

(54) VEHICLE SIDE COLLISION OCCUPANT RESTRAINT SYSTEM

(75) Inventors: David Zhao, Northville, MI (US); Leonard A. Shaner, New Baltimore, MI (US); James C. Cheng, Troy, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 532 days.

(21) Appl. No.: 10/904,279

(22) Filed: Nov. 2, 2004

(65) Prior Publication Data

US 2006/0090946 A1    May 4, 2006

(51) Int. Cl.
*B60R 21/00*     (2006.01)
(52) U.S. Cl. .................. 180/268; 280/801.1; 280/806; 280/807
(58) Field of Classification Search ............. 280/801.1, 280/805, 807, 808, 806; 180/268; 297/468, 297/466, 470, 474
See application file for complete search history.

(56) References Cited

U.S. PATENT DOCUMENTS

| 3,781,061 A | | 12/1973 | Walz et al |
| 3,907,059 A | * | 9/1975 | Takada et al. ............... 280/802 |
| 4,059,287 A | | 11/1977 | Weman |
| 4,191,421 A | | 3/1980 | Lechter |
| 4,632,425 A | * | 12/1986 | Barratt .................... 280/801.1 |
| 4,637,629 A | * | 1/1987 | Cummings ............... 280/801.1 |
| 6,179,329 B1 | * | 1/2001 | Bradley .................... 280/801.1 |
| 6,419,271 B1 | * | 7/2002 | Yamada et al. ............. 280/806 |
| 6,447,011 B1 | | 9/2002 | Vollimer |
| 6,565,121 B2 | | 5/2003 | Knych et al. |
| 6,592,166 B2 | | 7/2003 | Motozawa |
| 6,644,723 B2 | | 11/2003 | Motozawa |
| 6,769,716 B2 | * | 8/2004 | Rouhana et al. ............. 280/806 |
| 2004/0070191 A1 | * | 4/2004 | Higuchi et al. .............. 280/808 |

* cited by examiner

*Primary Examiner*—Ruth Ilan
(74) *Attorney, Agent, or Firm*—Frank MacKenzie

(57) ABSTRACT

A safety restraint system (10) for a vehicle (12) includes a seat belt buckle (60) and a retractor (53) mounted approximately at or below a pelvic level of a vehicle occupant (98). A seat belt (52) extends over a side pelvic portion (97) of vehicle occupant (98) and directly prevents outward lateral displacement of the side pelvic portion (97) during a side collision event.

16 Claims, 2 Drawing Sheets

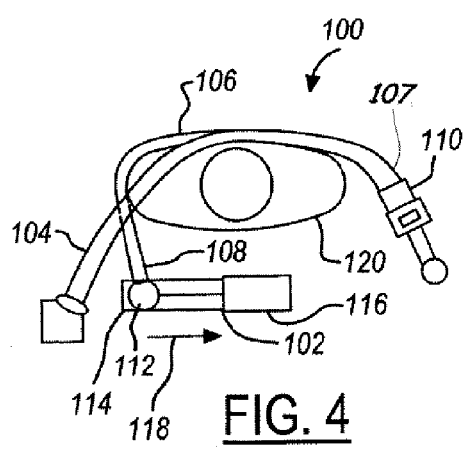
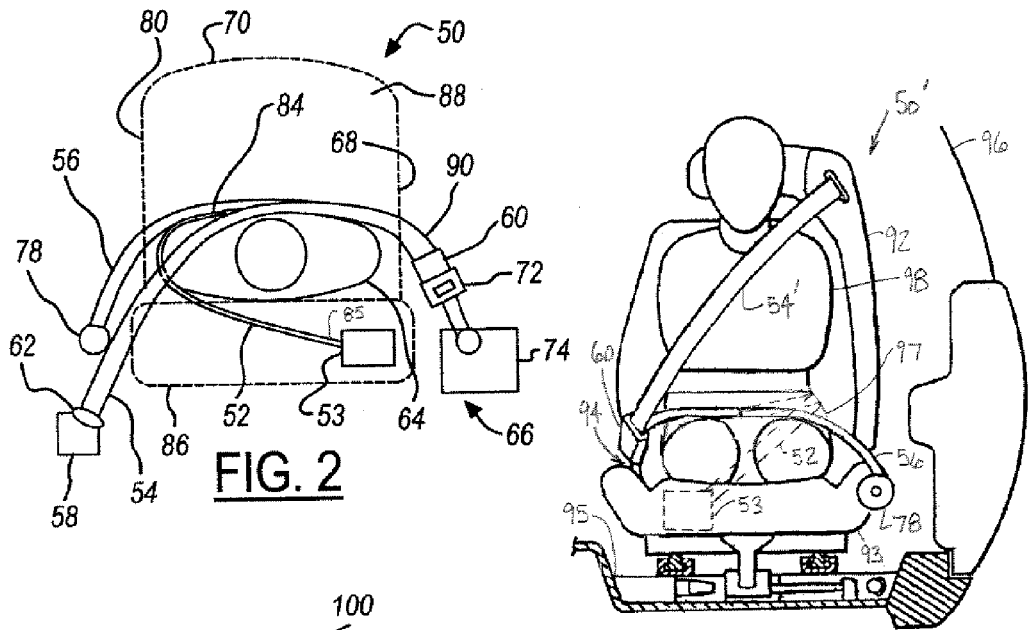
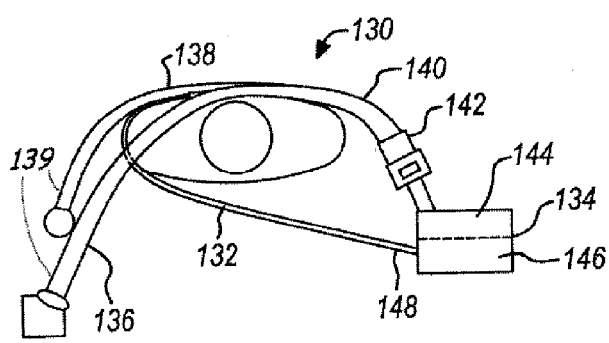
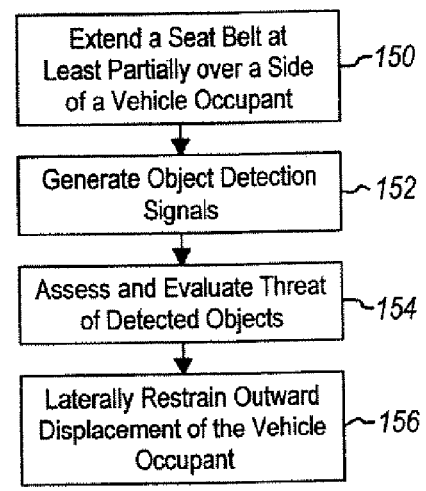

VEHICLE SIDE COLLISION OCCUPANT RESTRAINT SYSTEM

TECHNICAL FIELD

The present invention relates generally to automobile safety restraint systems. More particularly, the present invention relates to a system for minimizing and delaying the contact with and the load exerted on a vehicle occupant by a vehicle side interior structure during a side collision event.

BACKGROUND OF THE INVENTION

Automobiles utilize various passive and active safety restraint systems to protect vehicle occupants. The passive restraint systems may include restraint systems, such as systems having load absorbing and occupant deflecting materials, or systems, such as head restraint systems, seat belt systems, and airbags. The active restraint systems may include steering control and brake control systems. The restraint systems typically include collision severity sensors, which are used to gather information for control and deployment of the restraints.

To evaluate and develop existing and new restraint systems various computer simulations, sled tests, and vehicle collision tests are performed. The vehicle tests include barrier and vehicle-to-vehicle collision testing. Several testing procedures and requirements exist for such evaluation. The Insurance Institute for Highway Safety (IIHS) for example has a lateral impact new car assessment program (LINCAP) by which new vehicles are laterally impacted at a 27° offset angle at a resultant 38 mph. A head injury criterion and a thoracic trauma index is measured and compared with desired values to rate the new vehicle. Federal motor vehicle safety standards also exist for side collision testing, such as those in FMVSS214, which involve colliding the side of a vehicle at a resultant 33.5 mph. Both above test modes use $50^{th}$ percentile male test dummy and the collision object is a car like barrier.

Recently, IIHS adopted a new vehicle evaluation test for side collisions. The test is more severe than previous side collision tests. The test uses a heavier truck like barrier and a $5^{th}$ percentile female test dummy. New FMVSS214 regulations are to be imposed by the federal government starting approximately in the year 2009, which utilize the truck like barrier and $5^{th}$ percentile female test dummy. Thus, it is desired that newly introduced vehicles satisfy this type of testing.

Traditionally, to improve side collision performance of a vehicle during a side collision event, vehicle side structures have been reinforced and interior restraints have been designed. The structures have included B-pillars, roof rails, rocker panels, and doors. Sheet metal and trim panels of the stated structures have been altered. Items such as armrests have been modified such that they are recessed or collapsed during a collision event. The structural changes often involve costly tooling and require prolonged development. Also, the structural changes tend to provide minimal or limited improvement on collision performance as compared with modification to interior restraints.

Some current interior restraints that have been modified include foam blocks located within the doors of a vehicle, sometimes referred to as a pusher system, upper side airbags, and pelvic airbags. Although the foam blocks aid in the absorption of some of the collision event loads and tend to push a vehicle occupant laterally inward earlier in a collision event, the foam blocks often require door sheet metal or structural change. The upper side airbags are limited in their ability to protect the lower portions of an occupant body, such as the pelvic region. The pelvic airbags are also limited due to the amount of space available between an interior door trim panel and an occupant pelvis and the small amount of time available in a collision event to deploy a pelvic airbag.

Thus, there exists a need for an improved side safety restraint system that minimizes and delays the contact with and the load exerted on a vehicle occupant by a side vehicle structure during a side collision event.

SUMMARY OF THE INVENTION

The present invention provides a safety restraint system for a vehicle that includes a seat belt buckle and a retractor mounted approximately at or below a pelvic level of a vehicle occupant. A seat belt extends over a side pelvic portion of vehicle occupant and directly prevents outward lateral displacement of the side pelvic portion during a side collision event.

The embodiments of the present invention provide several advantages. One such advantage is the provision of a seat belt system that restrains and/or prevents outward lateral displacement of a pelvis of an occupant during a collision event. Preventing outward lateral displacement of the pelvis increases the amount of time between when an object contacts the side of the vehicle and when an interior door panel or side structure comes in contact with the occupant. The increase in time allows for increased collision energy absorption before occupant contact, thus decreasing the loads exerted on the occupant and deflections of occupant body parts, such as ribs.

Another advantage provided by an embodiment of the present invention is the provision of a seat belt system that restrains and/or prevents outward lateral displacement of a pelvis of an occupant during a collision event and that may be integrated into current production seat belt systems. This allows for the continued use of the current "buckle up" procedure of a vehicle occupant. The vehicle occupant may buckle up by performing the single task of pulling a single buckle across oneself and clipping it into a receiver. The operation of the seat belt system allows for ease in occupant ingress and egress.

Yet another advantage provided by an embodiment of the present invention is the provision of a seat belt system that restrains and/or prevents outward lateral displacement of a pelvis of an occupant during a collision event that does not provide discomfort to a vehicle occupant during normal vehicle operation.

Additionally, another advantage provided by an embodiment of the present invention is the provision of laterally restraining a vehicle occupant to a seat system such that during a collision event the vehicle occupant displaces inward with the seat away from a side structure of the vehicle. This further delays and prevents contact with the occupant.

The present invention itself, together with attendant advantages, will be best understood by reference to the following detailed description, taken in conjunction with the accompanying figures.

BRIEF DESCRIPTION OF THE DRAWING

For a more complete understanding of this invention reference should now be had to the embodiments illustrated in greater detail in the accompanying figures and described below by way of examples of the invention wherein:

FIG. 2 is a top view of a lateral restraining system incorporating a side seat belt and a rear retractor in accordance with an embodiment of the present invention;

FIG. 3 is a front view of a lateral restraining system incorporating a side seat belt and a rear retractor in accordance with another embodiment of the present invention;

FIG. 4 is a top view of a lateral restraining system incorporating a lateral pretension anchor in accordance with another embodiment of the present invention;

FIG. 5 is a top view of a lateral restraining system incorporating a side seat belt and a buckle/retractor in accordance with yet another embodiment of the present invention; and FIG. 6 is a method of restraining a vehicle occupant during a collision event in accordance with an embodiment of the present invention.

DETAILED DESCRIPTION

Figure 1:
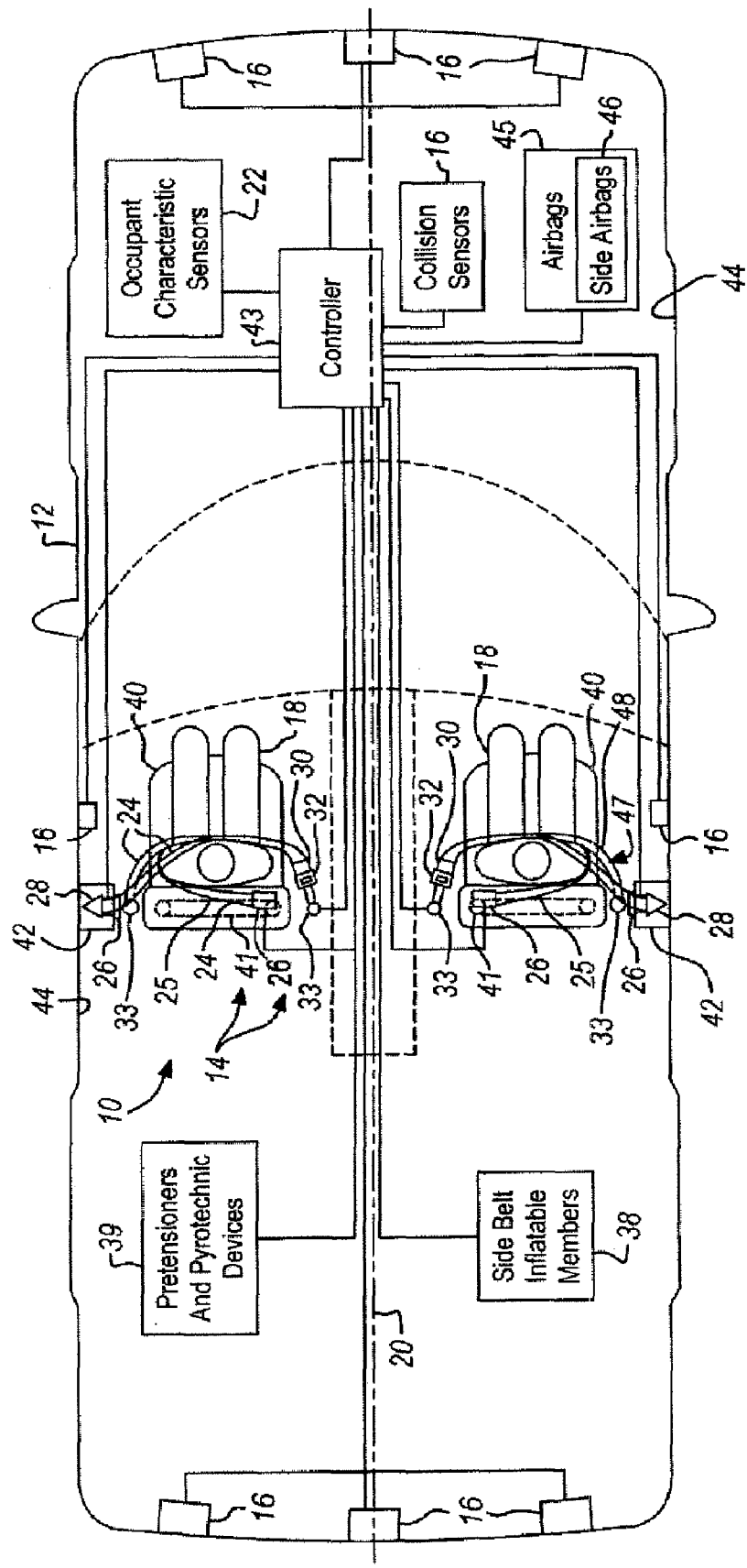
FIG. 1 is a top block diagrammatic view of a safety restraint system for a vehicle incorporating a lateral restraining system in accordance with an embodiment of the present invention.

In general, the fundamental function of interior restraints is to push or pull an occupant away from a door or side structure of a vehicle during a side collision event. It is desired that this push or pull action occur within approximately 40 ms from contact with an impending object to overcome occupant inertia. Also, during a side collision event the side door or B-pillar of the vehicle typically comes in contact with an occupant seat prior to coming in contact with the occupant. This occurs since the seat is often wider than the occupant and thus is closer to the door or B-pillar than the occupant. Thus, it is desired that the occupant be laterally restrained or constrained to the seat such that when the seat is pushed inward by the door or a side structure, the occupant is carried inward by the seat. This minimizes intrusion of an armrest on the door trim panel and side structures into the occupant during the collision event. The present invention provides such restraint, which is described in detail below.

In the following figures, the same reference numerals will be used to refer to the same components. While the present invention is described with respect to minimizing and delaying the contact with and the load exerted on a vehicle occupant by a side vehicle structure during a side collision event, the present invention may be adapted to be used in various applications and systems including: countermeasure systems, collision warning systems, collision avoidance systems, vehicle systems, or other similar systems known in the art. The present invention may be used to supplement a pre-collision sensing system. The present invention may also be applied in automobile and non-automobile applications.

In the following description, various operating parameters and components are described for one constructed embodiment. These specific parameters and components are included as examples and are not meant to be limiting.

Also, in the following description the term "performing" may include activating, deploying, initiating, powering, and other actions known in the art that may describe the manner in which a countermeasure may be operated.

Additionally, in the following description the term "countermeasure" may refer to an object or may refer to an action. For example, a countermeasure may be performed or a countermeasure may be activated. An airbag is a countermeasure. A controller may perform a countermeasure by signaling the airbag to deploy.

Moreover, a countermeasure device may be any device within an automotive vehicle that is used in conjunction with a collision countermeasure system including: a controller, a vehicle system, an indicator, or other countermeasure device known in the art.

In addition, the term "collision type" refers to collision severity and collision contact location of a collision. Collision type may include whether a collision is a frontal-oblique, side, offset, or head-on collision, as well as refer to other collision location type descriptions known in the art. A collision type may also include information related to relative size, weight, and collision change-in-velocity, as well as other collision type related information known in the art.

Referring now to FIG. 1, a top block diagrammatic view of a safety restraint system 10 for a vehicle 12 incorporating a lateral restraining system 14 in accordance with an embodiment of the present invention is shown. The safety system 10 includes multiple collision sensors 16 and the lateral restraining system 14. The lateral restraining system 14 prevents outward lateral displacement of vehicle occupants 18 during a collision event. The term "outward lateral displacement" refers to a direction perpendicular to and away from a longitudinal centerline 20 of the vehicle 12.

The collision sensors 16 may be used in the detection of a collision, in the determination of collision severity and collision contact location, and in the determination of a collision type. The collision sensors 16 may generate collision detection signals in response to a detected acceleration or displacement of the vehicle 12 or a vehicle component thereof. The collision sensors 16 may be used to detect an impending object and to determine the relative distance, speed, and heading of that object, as well as other various object parameters known in the art. The collision sensors 16 may be in the form of an accelerometer, an acceleration sensor, an inertial latch, a contact sensor, an object detection sensor, a radar sensor, a lidar sensor, an ultrasonic sensor, pressure sensor, or some other collision sensor known in the art. Any number of collision sensors 16 may be utilized and may reside in various locations on the vehicle 12.

The collision sensors 16 may also include occupant characteristic sensors 22, which are shown separately. The occupant sensors 22 may be used to determine occupant classification, weight, size, and location within a seat system. The occupant sensors 22 may include seat belt status sensors (not shown) for determining a current position or tension of seat belts within the vehicle 12. Any number of occupant sensors may be used and, all of which may be located in various locations on the vehicle 12.

The lateral system 14 may include multiple seat belts 24 with side belts 25 and accompanying retractors 26, D-rings 28, buckles 30 and corresponding receivers 32, anchors 33, and inflatable members, such as side belt inflatable members 38. The seat belts 24 may also have corresponding pretensioners and pyrotechnic devices 39, which may be located within or coupled to the retractors 26 and the receivers 32. The side belts 25 may be inflatable. The seat belts 25, the retractors 26, the D-rings 28, the buckles 30, the receivers 32, the pretensioners and pyrotechnic devices 39 may all be of various types and styles and be in various configurations; three configurations are shown with respect to the embodiments of FIGS. 2-4. The seat belts 24 reside over the occupants 18 and the seat systems 40. The seat systems include seat frames 41. Some of the retractors 26, D-rings 28, and anchors 33 may be coupled to the seat frames 41 or to the B-pillars 42 as desired.

A controller 43 may be coupled to the collision sensors 16, the retractors 26, the buckles 30, the receivers 32, and to the side belts 25, as well as to various pretensioners and pyrotechnic devices associated therewith, such as pretensioners and pyrotechnic devices 39. The controller 43 may activate and control the operation of the stated items during a collision event. The pretensioners and pyrotechnic devices 39 may include solenoids and electric motors. The pretensioners pull in on the associated seat belts to take up any slack in the belts and prevent the belts from extending during a collision event.

The controller 43 may be microprocessor based such as a computer having a central processing unit, have memory (RAM and/or ROM), and have associated input and output buses. The controller 43 may be in the form of an application-specific integrated circuit or may be formed of other logic devices known in the art. The controller 43 may be a portion of a central vehicle main control unit, an interactive vehicle dynamics module, or a main safety controller or may be stand-alone controller as shown.

The side belt inflatable members 38 may be located and integrated into the side belts 25 or into a side portion 47 of a lap belt 48 such that they wrap around an outboard side of the occupants 18. During a collision event the inflatable members 38 may be deployed to further restrain the occupants 18 away from the sides 44 of the vehicle 12.

The safety system 10 may also include airbags 45 including side airbags 46, which may operate in conjunction with the restraining system 14 to prevent contact of the occupants 18 with the sides 44 of the vehicle 12.

Referring now to FIG. 2, a top view of a lateral restraining system 50 incorporating a side seat belt 52 and a rear retractor 53 in accordance with an embodiment of the present invention is shown. The lateral system 50 includes the side belt 52, a shoulder belt 54, and a lap belt 56. The shoulder belt 54 is coupled between a shoulder belt retractor 58 and a buckle 60. The shoulder belt 54 extends from the retractor 58 through a D-ring 62 over a shoulder of the occupant 64 and down to the buckle 60. The retractor 58 may be, for example, coupled to a B-pillar of a vehicle. The buckle 60 is located on an inboard side of the occupant 64 in a lower seat pan/seat back region 66 along an inboard side 68 of the seat 70 and clips into a receiver 72. The receiver 72 may be coupled to a pyrotechnic device 74 for inward pulling or retracting of the side belt 52 and the lap belt 56 during a side collision event. The receiver 72 and the pyrotechnic device 74 may be combined into a single unit or may be separate units as shown.

The lap belt 56 is coupled between a lap belt anchor 78 and the buckle 60. The lap belt anchor 78 is located on an outboard side 80 of the seat 70 and may be coupled to a lower portion of a B-pillar (not shown) of the vehicle 12. The lap belt 56 extends from the lap belt anchor 78 across a pelvis of the occupant 64 to the buckle 60. The lap belt 56 and the shoulder belt 54 may be integrally formed into a single continuous seat belt.

The side belt 52 is coupled to the lap belt 56 and to a side seat belt retractor 53. The side belt 52 may be coupled in various locations onto the lap belt 56. The first lap belt end 84 of the side belt 52 may be integrally stitched into or with the lap belt 56, as shown, or may be coupled via a clasp (not shown) or may be fastened, adhered, or attached using some other method known in the art. The second end 85 of the side belt 52 is coupled to the retractor 53. The coupling method is such to withstand loading during a collision event. The side belt 52 is coupled to the lap belt 56 such that the side belt 52 extends around a side of the occupant and restrains the pelvis when retracted during a collision event. The side belt 52 may be coupled directly to the buckle 60 rather than to the lap belt 56. The side retractor 53 is located rearward of or below the occupant and may be located within or external to the seat 70. The side retractor 53 may be located in the seat back 86, in or below the seat pan 88, or may be attached to a vehicle structure external to the seat 70, such as a vehicle frame.

The side belt 52 has a used and unused state. When used the side belt 52 wraps around an outboard side of the occupant 64. When unused a portion of the side belt 52 is retracted into the side retractor 53 and a portion of the side belt 52 rests against the seat back 86. The side belt 52 may also extend within the seat back 86, such as behind a seat cover and extend through the seat cover and around the outboard side of the occupant when used. When located under a seat cover a significant portion of the side belt 52 is hidden from view and is not in direct contact with the occupant 64.

The buckle 60 and the side retractor 53 may each contain or be coupled to a pyrotechnic device, such as device 74. When a pyrotechnic device is utilized in or with the buckle 60, the inboard end 90 of the lap belt 56 is pulled towards the buckle 60 in effect restraining the pelvis to the buckle 60 or inward away from the side of a vehicle. When a pyrotechnic device is utilized in the side retractor, the side retractor retracts the side belt during a collision event. The retraction of the side belt also restrains the occupant inward away from the side of the vehicle.

Referring now to FIG. 3, a front view of a lateral restraining system 50' incorporating a side seat belt 52 and a rear retractor 53 in accordance with another embodiment of the present invention is shown. The lateral restraining system 50' is similar to the lateral restraining system 50, except that the shoulder belt 54' has a corresponding retractor (not shown) within the seat back 92 rather than on a B-pillar, such as the retractor 58. The rear retractor 53 may be located within the seat pan 93, as shown, in the lower portion 94 of the seat back 92, on the floor 95, or elsewhere in the vehicle 96. The side seat belt 52 extends around the pelvis 97 of the passenger 98, which aids in restraining or shifting a significant mass and bone structural region of the passenger 98. The side seat belt 52 is positioned near the center of gravity of the passenger 98. The rear retractor 53 is mounted approximately at or below a pelvic level of the passenger 98.

Referring not to FIG. 4, a top view of a lateral restraining system 100 incorporating a lateral pretension anchor 102 in accordance with another embodiment of the present invention is shown. The lateral system 100 includes a shoulder belt 104 and a lap belt 106 similar to the shoulder belt 54 and the lap belt 56. The lap belt 106 has an inboard end 107 and an outboard end 108. However, the outboard end 108 of the lap belt 106 is anchored to the lateral pretensioner anchor 102 rather than being coupled to a B-pillar. The lateral pretensioner anchor 102 may be coupled to a seat frame or to a vehicle frame. The shoulder belt 104 and the lap belt 106 are also coupled to a buckle 110, which may also have or be coupled to a pyrotechnic device.

The lateral pretensioner anchor 102 includes a ball 112, a slider 114, and a pretensioner 116. The outboard end 108 is coupled to the ball 112, which slides inward in the slider 114, as indicated by arrow 118, when the pretensioner 116 is activated. The inward displacement of the ball 112 may be approximately greater than 5 inches to provide sufficient restraining of the occupant 120. This inward displacement of the ball 112 also restrains the occupant 120 inward. The lateral pretensioner anchor 102 is not activated in a frontal or a rear end collision and in such instances performs as a typical fixed anchor.

The embodiment of FIG. 4 may provide additional restraining of the occupant to a seat back over that of the embodiment of FIG. 2. This may be due to the pretensioning of the outboard end 108 and the reduced amount of initial wrapping of the lap belt 106, as compared to the side belt 52, around the side of the occupant 120.

Referring now to FIG. 5, a top view of a lateral restraining system 130 incorporating a side seat belt 132 and a receiver/retractor 134 in accordance with yet another embodiment of the present invention is shown. The lateral system 130 includes a shoulder belt 136 and a lap belt 138 similar to the shoulder belt 54 and the lap belt 56. The side belt 132 is similar to the side belt 52. The shoulder belt 136 and the lap belt 138 have outboard ends 139 and inboard ends 140. However, the inboard ends 140 are coupled to a buckle 142 that latches to the receiver/retractor 134. The receiver/retractor 134 provides efficient packaging in that it serves dual purposes; the receiver/retractor 134 performs as a pyrotechnic receiver for the lap belt 138 and as a retractor for the side belt 132. The receiver/retractor 134 includes a receiver portion 144 for the buckle 142 and a retractor portion 146 for the side belt 132. The inboard end 148 of the side belt 132 is coupled to the retractor portion 146 rather than to a separate retractor located rearward of the occupant, such as the retractor 53.

The above-described lateral systems 14, 50, 100, and 130 delay contact time between the pelvis of an occupant and the side structures of a vehicle. This delay may be as much as 8 ms, which can significantly reduce deflections, such as rib deflections of an occupant during a side collision event.

Referring now to FIG. 6, a method of restraining a vehicle occupant during a collision event in accordance with an embodiment of the present invention is shown.

In step 150, a side seat belt or a lap belt, such as side belts 25, 52, and 132 and lap belt 106 are extended over a side pelvic region of a vehicle occupant. The side belt or lap belt is extended over the side of the vehicle occupant during the single step buckling operation of a shoulder and lap belt combination, such as the buckling operation of the shoulder and lap belts 54, 56, 104, 106, 136, and 138.

In step 152, one or more impending objects are detected and object detection signals are generated by one or more of the collision sensors 16 in response thereto. In step 154, a controller, such as controller 43 assesses and evaluates the threat of the detected objects and generates collision signals in response to said threat.

In step 156, outward lateral displacement of the vehicle occupant is prevented during a collision event via the side seat belt or lap belt of step 150 in response to the collision signals. The pretensioners and pyrotechnic devices associated with the side seat belt and lap belt of step 150 may be activated by a controller, such as controller 43, to restrain the vehicle occupant inward away from any vehicle side structures, such as door panels, A-pillars, B-pillars, side panels, or other side vehicle structures known in the art. Pretensioners and pyrotechnic device or the like that are coupled to lap belt buckle receivers and side seat belts may be activated. The pretensioners and pyrotechnic devices increase tension in the side seat belt and/or lap belt through removal of slack in the stated belts.

The above-described steps are meant to be illustrative examples; the steps may be performed sequentially, synchronously, simultaneously, or in a different order depending upon the application.

The present invention provides a vehicle safety system that provides lateral restraining systems that may be utilized to minimize and prevent contact between vehicle side structures and vehicle occupants during a side collision event. The present invention increases the delay time between when an object collides with a vehicle and when a vehicle occupant comes in contact with a vehicle side structure, thereby minimizing the loads exerted on and bodily deflections experienced by a vehicle occupant. Thus, the present invention provides an improved safety restraint system that prevents injury to a vehicle occupant during a side collision event.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A safety restraint system for a vehicle comprising:
   at least one seat belt buckle;
   at least one retractor mounted approximately at or below a pelvic level of a first side of a vehicle occupant; and
   at least one seat belt extending completely around and in contact with at
   at least a side pelvic portion of said vehicle occupant opposite said first side such that said vehicle occupant is partially encircled thereby; said at least one seat belt directly preventing outward lateral displacement of said side pelvic portion during a side collision event; wherein said at least one seat belt extends across said vehicle occupant, passes around said vehicle occupant's side pelvic portion and continues back towards said first side.

2. A system as in claim 1 wherein said at least one seat belt comprises a lap belt that extends at least partially around said side pelvic portion.

3. A system as in claim 1 wherein said at least one seat belt comprises a side seat belt comprising:
   a first end coupled to said at least one buckle; and
   a second end coupled to said at least one retractor.

4. A system as in claim 1 further comprising:
   at least one collision sensor generating a collision signal; and
   a side refractor coupled to said at least one seat belt and preventing outward lateral displacement of said side pelvic portion in response to said collision signal.

5. A system as in claim 4 wherein said at least one collision sensor is selected from at least one of an accelerometer, an acceleration sensor, an inertial latch, a contact sensor, an object detection sensor, a radar sensor, a lidar sensor, pressure sensor, and an ultrasonic sensor.

6. A system as in claim 4 wherein said at least one seat belt comprises:
   a lap belt; and
   a side belt coupled to said lap belt.

7. A system as in claim 6 wherein said side retractor removes slack in said side belt.

8. A system as in claim 6 wherein said side retractor comprises a pyrotechnic device that retracts said side belt during said collision event.

9. A system as in claim 6 wherein said lateral restraining system comprises a pretensioner that retracts said side belt during said collision event.

10. A system as in claim 6 wherein said side retractor comprises a pyrotechnic buckle that pulls said side belt during said collision event.

11. A system as in claim 10 wherein said pyrotechnic buckle is coupled to said lap belt and pulls said lap belt during said collision event.

12. A system as in claim 6 wherein said lateral restraining system comprises a lateral pretensioning anchor that displaces a portion of said side belt inward within the vehicle during said collision event.

13. A system as in claim 6 wherein at least a portion of said side belt inflates during said collision event.

14. A system as in claim 6 further comprising:
   a buckle; and
   wherein said side retractor coupled to said buckle and retracts said side belt.

15. A system as in claim 14 wherein said side retractor comprises a pyrotechnic device and retracts said side belt during said collision event.

16. A system as in claim 1 wherein said at least one seat belt comprises a shoulder belt.

* * * * *